3,002,814
PRODUCTION OF NICKEL SULFATE FROM HIGH-TEMPERATURE CALCINED GREEN NICKEL OXIDE

Robert V. Horrigan, Lewiston, N.Y., assignor to National Lead Company, New York, N.Y., a corporation of New Jersey
No Drawing. Filed Aug. 13, 1959, Ser. No. 833,391
9 Claims. (Cl. 23—117)

This invention relates to the production of nickel sulfate and is particularly concerned with the use of the green nickel oxide obtained by high-temperature calcination as a starting material for such production.

Green nickel oxide is an important commercial raw material for the production of nickel salts since it is one of the forms in which nickel is stockpiled by the United States Government. The green oxide is usually obtained by high-temperature (1000° C.–1200° C.) calcination of basic nickel carbonate, although other nickel salts or nickelous hydroxide may be used instead of the basic carbonate. As the calcination temperature increases the color changes from black to a yellow-green and the specific gravity increases. It has been found heretofore that when the calcination temperature is 1000° C. or above, the specific gravity of the oxide exceeds 6.31. In this state the oxide is considered chemically inactive since it is dissolved only slightly and with difficulty by acids. For example, Prasad et al. in Journal of the Chemical Society (London), p. 1403 (1931) report that with green nickel oxide calcined at 1000° C. only 0.77% was dissolved by 0.1 N sulfuric acid at 80° C. In later work it has been found that green nickel oxide heated with oleum (20% free $SO_3$) for 2 hours at 100°–110° C. is only dissolved to the extent of 1.3%. Such resistance to attack is thought to be due to a considerable shrinkage of the crystal lattice which takes place during calcination.

It is an object of the present invention to provide a process for making nickel sulfate from such inactive nickel oxide.

Another object of the invention is to provide a process of the character described which may be carried out inexpensively and conveniently.

A further object of the invention is to provide a process of the character described which is adapted for use with nickel oxide of very high specific gravity.

Another object of the invention is to provide a practical, new source for the manufacture of nickel chemicals.

Other objects and advantages of the present invention will be apparent from the following description thereof.

It has now been discovered that green nickel oxide that has been calcined at temperatures above 1000° C. and has a specific gravity exceeding 6.31 may be converted to nickel sulfate by treatment with sulfuric acid under controlled and specific conditions. Such treatment is described in the following examples:

Example 1

To 76 grams of green nickel oxide (sp. gr. 6.89) which had been pulverized to pass a 200 mesh sieve there was added 98 grams of $H_2SO_4$ as a 30% solution in water. This mixture was heated for two hours while being continuously agitated. During this period the temperature of the mixture slowly increased until its boiling point was about 150° C., whereupon an energetic, exothermic reaction took place with the temperature of the mixture rising rapidly to about 205° C. This was accompanied by copious evolution of $SO_3$ and the mixture changed from a slurry to a mass of paste-like consistency. The reaction mass was cooled and then leached with hot water. The resulting solution contained nickel sulfate equivalent to 60 grams of nickel oxide which was readily obtained as crystals of $NiSO_4.6H_2O$ by evaporation of water from the solution. Thus, the process converted 79% of the original nickel oxide to soluble nickel sulfate.

Example 2

76 grams of green nickel oxide (sp. gr. 6.89), pulverized to pass a 200 mesh sieve, was placed in a glass vessel and 98 grams of $H_2SO_4$ as a 60% solution in water was added thereto. This mixture was heated with continuous agitation for two hours, during which the temperature of the mixture slowly rose from 110° C. to about 150° C. At this point a noticeably exothermic reaction rapidly increased the temperature of the mixture to about 200° C. and the mixture became a paste from which $SO_3$ fumes were freely evolved. After the reaction mass cooled, it was leached with hot water. It was found that 48 grams of nickel oxide had been dissolved as nickel sulfate, this being a 63.1% conversion of nickel oxide to soluble nickel sulfate.

Example 3

The procedure described in Example 2 was repeated except, however, that the mixture was heated slowly for four hours until the boiling point rose to about 150° C. It was found that the soluble nickel sulfate obtained represented a conversion of 69% of the nickel oxide.

Example 4

The procedure described in Example 2 was repeated except, however, that the boiling point of the mixture was raised to about 150° C. in one hour. The conversion of NiO to nickel sulfate by the process was 60.5%.

Example 5

The procedure described in Example 2 was repeated except, however, that 98 grams of $H_2SO_4$ as a 70% solution in water was used and the mixture was heated to about 150° C. in one hour. The NiO conversion to soluble nickel sulfate was only 59.8%. In this experiment, as also in the two immediately preceding experiments, an energetic, exothermic reaction took place when the temperature of the mixture had been raised to about 150° C. The energy liberated by this reaction caused the temperature of the mass to rise quickly to about 200° C. and become pasty in consistency.

Example 6

To 76 grams of −200 mesh green nickel oxide (sp. gr. 6.89) in a glass vessel there was added 196 grams of $H_2SO_4$ as a 60% solution in water. The slurry was heated with constant agitation for two hours with the boiling point of the acid gradually increasing as water was evaporated. At about 150° C. a strongly exothermic reaction took place in the mixture. This caused the temperature to rise quickly to about 200° C. and the mixture became a paste which gave off fumes of $SO_3$. When the reaction mass had cooled it was leached with hot water and it was found that 46.5 grams of the NiO had been dissolved. This represented a 61.1% conversion of nickel oxide to soluble nickel sulfate. Upon re-treating the remaining 29.5 grams of undissolved nickel oxide in the same way, it was found that an additional 18.0 grams of NiO had been dissolved. This gave an overall conversion to soluble nickel sulfate in the two stages of treatment of 94.9% of the NiO.

A modified procedure, according to the invention, for producing nickel sulfate from green nickel oxide is illustrated in the following examples:

Example 7

A 50 gram sample of −200 mesh green nickel oxide (sp. gr. 6.89) was mixed with 8 ml. of water until it was thoroughly wet. There was then mixed in 64.4 grams of $H_2SO_4$ as 95% acid. Upon heating the mixture to about 150° C. an actively exothermic reaction took place and $SO_3$ fumes were evolved as the temperature rapidly rose. The reaction mass was held at about 275° C. for one hour, then cooled and leached with hot water. It was found that 52.0% of the nickel oxide had been converted to soluble nickel sulfate which was obtained as crystals of $NiSO_4.6H_2O$ by evaporation of water.

*Example 8*

The procedure described in Example 7 was repeated except, however, that after the occurrence of the exothermic reaction the reaction mass was held at about 275° C. for two hours. The conversion of NiO to nickel sulfate was found to be 66%.

*Example 9*

The procedure described in Example 7 was repeated except, however, that the reaction mass was held at approximately 340° C. for 2.5 hours after the exothermic reaction took place. Seventy-one percent of the NiO was converted to nickel sulfate.

Prolonged heating of the reaction mass tends to increase the degree of conversion of the nickel oxide to nickel sulfate as shown below:

*Example 10*

A 50 gram sample of −200 mesh green nickel oxide (sp. gr. 6.89) was treated according to the procedure described in Example 7, but holding the reaction mass within the stated temperature range for 21 hours. It was found after leaching with water that 74.5% of the NiO was converted to soluble nickel sulfate.

On the other hand, holding the reaction mass at lower temperatures is less effective in producing nickel sulfate. This is illustrated by the following example:

*Example 11*

A 50 gram sample of −200 mesh green nickel oxide (sp. gr. 6.89) was treated according to the procedure described in Example 7 except that the oxide was not pre-wet by contact with water and that the reaction mass resulting from the exothermic reaction was held at about 200° C. for 8 hours. In this case the amount of soluble nickel sulfate obtained by leaching the mass with water corresponded to only 57% of the NiO.

It will be perceived from the foregoing examples that there is a time-temperature-acid concentration relationship involved in the present novel process. Essential in the carrying on of the process is the heating of the mixture of oxide and acid to a temperature of about 150° C. There results an energetic, exothermic reaction, the heat given off being sufficient to increase the temperature of the reaction mass to about 200° C. or somewhat higher. To secure a good conversion of green nickel oxide to nickel sulfate a heating time of at least about an hour is required. Heating for two–three hours is preferred but, of course, further prolonged heating is possible. In fact, there appears to be no upper limit on the heating time that may be employed. Where the heating period is subsequent to the exothermic reaction, a temperature above 200° C. and preferably between about 275° C. and about 350° C. is used. If desired, temperatures higher than the latter range may be employed but the temperature should not be so high as to decompose the nickel sulfate and it does not appear that the results obtained would normally justify the use of temperatures above about 350° C.

In carrying out the present novel process the sulfuric acid concentration at the surfaces of the nickel oxide particles is also important. In general, concentrated acid does not produce as good results as weaker acid.

As shown in the examples, an acid of 30%–60% concentration may be used advantageously. Even less concentrated acid may be employed but a disadvantage of the use thereof is that more heat is required to produce the necessary exothermic reaction. On the other hand, somewhat more concentrated acid is quite feasible, particularly if, as in Examples 7–9, the concentration of the acid at the surfaces of the NiO particles is lowered by water present on the particles as a result of the previous wetting of the particles.

The proportion of $H_2SO_4$ to nickel oxide used in the reaction need be only the theoretical one. Greater amounts may be employed but there appears to be no resulting advantage. It has been found that best results are obtained when the dense, green nickel oxide is pulverized to pass through a 200 mesh sieve before treatment. However, extra fine grinding of the oxide does not appear to increase the conversion to nickel sulfate. In the foregoing examples leaching of the reaction mass resulting from acid treatment of the NiO with hot water has been specified. The use of hot water is preferred since nickel sulfate is much less soluble in cold water than in hot. Cold water can, however, be employed for leaching if desired.

The nickel sulfate resulting from the process of the present invention is readily converted to other nickel salts. Such conversion is illustrated in the following example.

*Example 12*

An aqueous solution of nickel sulfate, as obtained by following Example 1 above, containing about 10% nickel was neutralized by the addition thereto of an aqueous, approximately 10% solution of sodium carbonate. As the carbonate solution was added slowly, with agitation, the pH of the mixture rose and a light, green, dense precipitate of nickel carbonate ($NiCO_3$) appeared. Addition of the carbonate solution was discontinued when the pH reached 8.0 and the nickel carbonate was filtered off, washed and dried at 110° C. for 8 hours. The yield of product is substantially 100% since a negligible amount of nickel remains in the mother liquor after filtration.

It will be seen from the foregoing description that remarkably and unexpectedly high conversions of dense green nickel oxide to nickel sulfate may be obtained by the invention of the present application and that the nickel sulfate may be readily converted to other desired nickel salts. Accordingly, the process is a very useful and valuable one which opens up a new source for nickel chemicals. The fact that until now nickel chemicals have been made from nickel metal may be regarded as indicative of the extent to which nickel oxide as a raw material for the manufacture of such chemicals has been regarded unfavorably. Although in the foregoing description there have been pointed out certain modified procedures and possible variations in practice, it will be understood that these are only exemplary and that other modifications and variations are possible without departing from the spirit of the present invention. It is desired, therefore, that the invention shall not be regarded as limited to the precise details of the examples herein, but shall be construed as broadly as permitted by the appended claims.

Percentages stated in the foregoing description and in the appended claims are percentages by weight.

I claim:

1. A process for producing nickel sulfate from finely divided, high-temperature calcined, green nickel oxide having a specific gravity in excess of 6.30 which comprises initiating an energetic, exothermic reaction by bringing a mixture of said oxide wth a sulfuric acid solution to a temperature of about 150° C. and following said reaction, leaching the reaction mass with water to remove nickel sulfate, the mixture being heated for at least one hour and the sulfuric acid solution being present in at least the theoretical amount required to convert the nickel oxide to nickel sulfate.

2. A process for producing nickel sulfate from finely divided, high-temperature calcined, green nickel oxide having a specific gravity in excess of 6.30 which comprises contacting the particles of oxide with at least the theoretical amount of a sulfuric acid solution, heating the mixture thus formed to about 150° C. to bring about an energetic, exothermic reaction and, following said reaction, leaching the reaction mass with water to remove nickel sulfate, the mixture being heated after the addition of the acid for at least one hour.

3. A process as set forth in claim 2 in which a solution of sulfuric acid of from about 30%–60% concentration is used and the mixture is heated for at least two hours.

4. A process for producing nickel sulfate from finely divided, high-temperature calcined, green nickel oxide having a specific gravity in excess of 6.30 which comprises contacting the particles of oxide with at least the theoretical amount of a sulfuric acid solution, heating the mixture to about 150° C. to bring about an energetic, exothermic reaction and, following said reaction, leaching the reaction mass with water to remove nickel sulfate, the mixture being heated after the addition of the acid and before the reaction for at least one hour.

5. A process as set forth in claim 4 in which a solution of sulfuric acid of from about 30%–60% concentration is used and the mixture is heated for at least two hours.

6. A process for producing nickel sulfate from finely divided, high-temperature calcined, green nickel oxide having a specific gravity above 6.30 which comprises wetting the particles of said oxide with water, adding to the wet oxide at least the theoretical amount of a concentrated sulfuric acid solution, thereby to form a more dilute acid solution on the surfaces of said particles and to increase the temperature to about 150° C., thus initiating an energetic exothermic reaction, heating the reaction mass for at least one hour at a temperature above 200° C., and thereafter leaching said mass with water to remove nickel sulfate.

7. A process as set forth in claim 6 in which a 95% sulfuric acid solution is used.

8. A process as set forth in claim 6 in which the reaction mass is heated, after the exothermic reaction, for at least two hours at a temperature of at least 275° C.

9. In a process for producing nickel sulfate from finely divided, high-temperature calcined, green nickel oxide having a specific gravity in excess of 6.30, the step of initiating an energetic, exothermic reaction by bringing to about 150° C. a mixture of said oxide with a sulfuric acid solution, said solution being present in at least the theoretical amount required to convert the nickel oxide to nickel sulfate.

References Cited in the file of this patent

UNITED STATES PATENTS 723,158   Jenkins _____ Mar. 17, 1903